INVENTOR.
ROBERT M. WALLIS
BY
*Richard G. Geib*
ATTORNEY

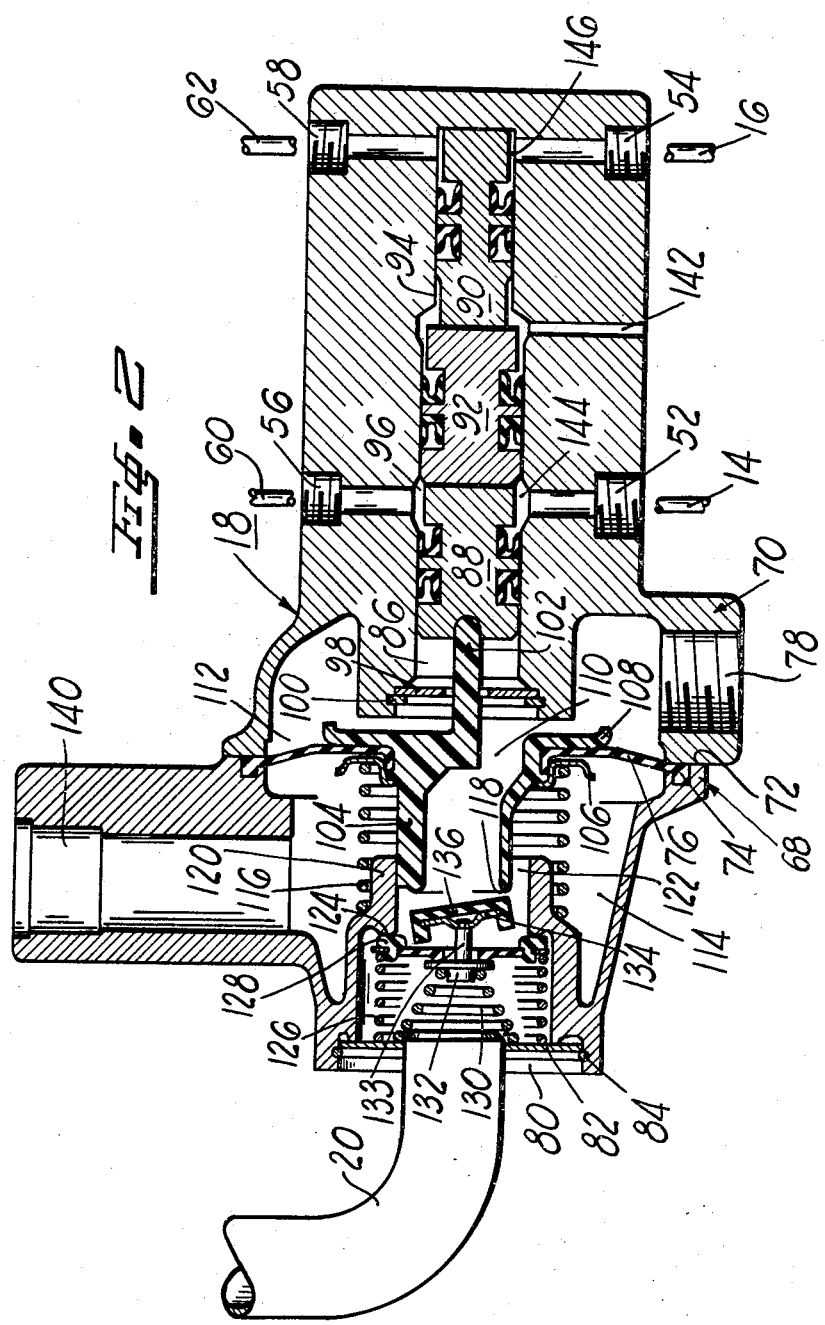

United States Patent Office 3,492,053
Patented Jan. 27, 1970

3,492,053
DUO-SERVOMOTOR VALVE MEANS
Robert M. Wallis, South Bend, Ind., assignor to The Bendix Corporation, a corporation of Delaware
Filed Mar. 6, 1968, Ser. No. 710,952
Int. Cl. B60t 13/56
U.S. Cl. 303—13                                            9 Claims

ABSTRACT OF THE DISCLOSURE

A valve device for controlling the operation of one or more differential pressure servo devices from a duo-hydraulic actuator incorporating primary and secondary piston elements with the secondary piston elements being operatively connected to the primary piston element such that it is ineffective until a failure of the primary piston element to actuate the valve means.

Figure 1:
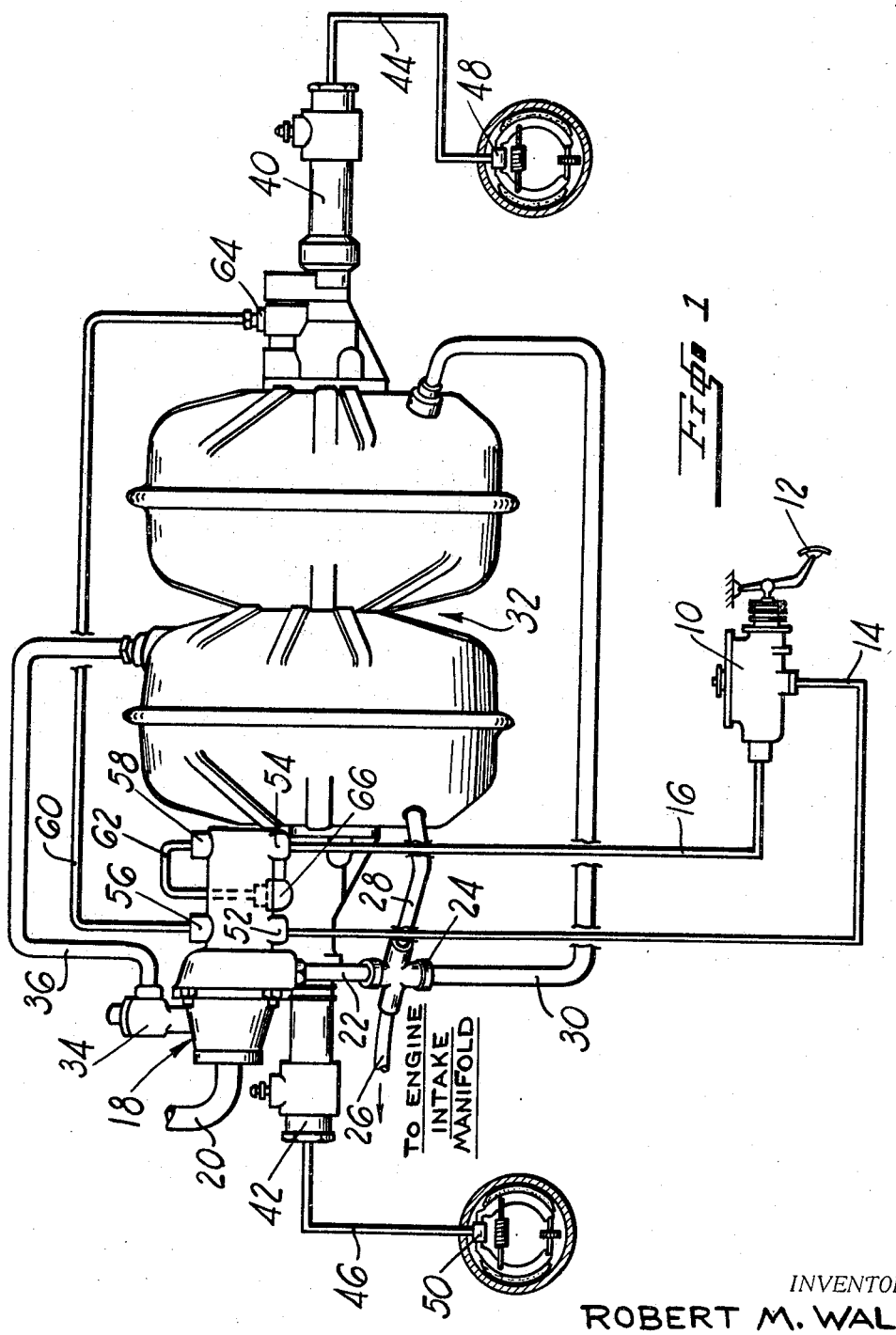

It has been observed that in controlling remote servomotor systems from a tandem actuator such as a split master cylinder in a vehicle braking system that because of the very fact that the pressures delivered by the tandem actuator from its primary chamber and its secondary chamber are not equal, the servomotor has a control problem. Furthermore, it has been observed that it is possible to have a problem of high hysteresis with such a system.

Such systems are observed in prior art Patents Nos. 3,268,270 and 3,362,756, as well as Italian Patent No. 611,675.

It is the intent of this invention to provide a control valve for such system which incorporates the fail-safe characteristics of the prior art devices while at the same time eliminating the problems aforementioned.

Description

Other objects and advantages of this invention will appear to those skilled in the art to which it relates from the following description of the drawings in which:

FIGURE 1 shows a servomotor system actuating device in schematic form with which this invention is concerned; and FIGURE 2 shows a cross section of the control valve for the servomotor system of FIGURE 1 incorporating the elements of this invention.

With reference now to FIGURE 1, there is shown a master cylinder 10 operable by a brake pedal 12 to create separate fluid pressures for conduits 14 and 16 communicating the master cylinder 10 to a valve means 18.

The valve means 18 is provided with an atmospheric inlet to which is connected a conduit 20 leading from an air cleaner or the like. A vacuum inlet via a tube 22 is provided to valve means 18. Tube 22 is connected to a fitting 24 which permits the joinder of a branch conduit 26 that is, as the legend in FIGURE 1 indicates, connected to the engine intake manifold for the vehicle. Other branches 28 and 30 from the fitting 24 communicate the vacuum from the engine intake manifold or from a vacuum reservoir, as may be the case, to vacuum chambers within the housing 32 of the servomotor boost section.

Also the valve 18 is provided with a control discharge port to which a fitting 34 is joined which in turn joins a control conduit 36 to this port. The control conduit 36 communicates to the central chamber of the housing 32 of the booster section of the servomotor.

While the details of the booster construction are not considered part of this invention, it will be realized by those skilled in the art to which this invention relates that the housing of the booster section 32 of the servomotor is constructed so as to have two diaphragms internally thereof dividing each half into a vacuum chamber and a control chamber. The control chambers are communicated via an opening through the housing at the center portion thereof to essentially provide one control chamber with two independent movable walls controlled thereby. The servomotor is completed by the provisions of slave hydraulic cylinders 40 and 42 which are internally provided with hydraulic pistons controllable by the diaphragms in the booster section for the development of pressures to conduits 44 and 46 leading to, respective, wheel cylinders 48 and 50 for braking mechanisms of separate axles of the vehicle in which this servomotor is associated. It should also be noted before passing on to the specific construction of the valve 18 that the conduits 14 and 16 are communicated to inlet ports 54 and 52 to actuate the inernal valving mechanism hereinafter described in detail. The valve 18 also has hydraulic discharge ports 56 and 58 to which conduits 60 and 62 are connected. These conduits 60 and 62 lead to ports 64 and 66 in the respective slave cylinders 40 and 42 to provide fluid compensation for the slave cylinders as well as limited manual braking capability in the event of a power failure of the booster section of the servomotor.

Turning now to the specific details of construction of the control valve 18 with reference to FIGURE 2, there is shown a valve housing comprising two portions 68 and 70 that are joined together, as at 72, by a plurality of radial bolts (not shown). At the juncture of the housing members 68 and 70 a bead 74 of a diaphragm 76 is compressed between the sections 68 and 70 to seal the assembly. As seen, the housing member 70 includes a reference fluid low presure port 78, the vacuum port for the attachment thereto of conduit 22 of FIGURE 1. The housing member 68 is provided with an atmospheric air or high pressure inlet port 80 to which the conduit 20 having flange 82 is assembled by means of snap ring 84. In addition, the housing member 70 comprises the hydraulic inlet ports 52 and 54 as well as the hydraulic discharge ports 56 and 58. It may be readily observed that the ports 52 and 56 are connected together via a bore 86 in the housing 70 as are the ports 54 and 58. A pair of pistons 88 and 90 are slidably arranged in the bore 86 with a floating piston 92 therebetween. All of the pistons have fore and aft facing seals to prevent communication of fluid from one face thereof to the other face thereof. As seen, the bore 86 is a stepped bore that has a reduced diameter portion 94 for the piston 90; whereas its large diameter portion 96 contains both the piston 88 and the floating piston 92. The bore 86 is provided with a stop plate 98 held in the open end thereof, as by snap ring 100 to limit the distance that the piston 88 can travel. Piston 88 is provided with a recess in its left face, as seen in the drawing, to receive a stem 102 of a valve plunger 104 that is held within the housing of the control valve 18 by the diaphragm 76 being clamped in a recess in the plunger 104 by a spring retainer 106 so as to reset against a radial flange 108. The valve plunger 104 has a passage 110 through it so as to communicate the vacuum chamber 112 with the control chamber 114 in the attitude shown in FIGURE 2 where the return spring 116 has, via the valve plunger 104 and its stem 102, retracted the piston 88, 90 and 92 to their extreme right position within the bore 86 of the housing section 70. The forward face of the valve plunger 104 is provided with an annular valve seat 118.

The housing member 68 is provided with an inwardly positioned collar 120 which supports and guides the plunger 104 in its reciprocatory movement within the control valve 18. As seen the plunger 104 is further formed so as to provide a passage 122 at spaced intervals between it and the collar 120 for fluid communication into the control chamber 114. The collar 120 is provided with a fixed valve seat 124 facing the atmospheric port 80, and plate 82 provides a bearing for spring 126 for operatively urging a resilient valve seat 128 onto the seat 124 of the collar 120. In addition a spring 130 is operatively arranged between the plate 82 and a central valve 132 for urging it onto the resilient valve 128 about the central opening in valve 128. The valve 132 has a stem 133 extending through the opening to which a disc 134 is connected over which a resilient valve seat 136 is snap fitted such that the disc 134 and seat 136 extend along a line at an angle to the plane of contact of the rubber poppet 128 with the valve seat 124 on the same side of valve 128 as seat 124.

The description of the construction of the valve 18 is then completed by referencing the control discharge port 140 which in FIGURE 1 receives the fitting 34 for joining the conduit 36 leading to the control chambers of the booster section of the servomotor therewith. Also the housing section 70 is provided with a bleed opening 142 which is between the abutting connection of the floating piston 92 and the small diameter piston 90 so that fluid leakage by the floating piston 92 from the primary chamber 144, or by the piston 90 from the secondary chamber 146 will be vented to atmosphere and not be able to provide fluid blockage for hindering the operation of the valve 18.

Operation

In the operation the operator of the vehicle will depress the brake pedal 12 to generate separate pressures for the conduits 14 and 16 leading to the inlet ports 52 and 54 of the control valve 18. However, as will be readily realized by those skilled in the art to which this invention relates, the split master cylinder 10, while providing separate fluid pressures, provides unequal fluid pressures. It develops a greater pressure from its primary chamber connected to the conduit 14 than is normally possible from its secondary chamber connected to the conduit 16. However, as it is possible that a master cylinder of the type as that shown in FIGURE 1 could be designed to have substantially equal pressure developments, the invention aforedescribed is still applicable to provide fail-safe operation of the valve 18 while eliminating unnecessary moving parts during normal operation. As seen, the pressure from the primary chamber connected to the conduit 14 is introduced to inlet 52 to act upon the piston 88 and the floating piston 92. At the same time the pressure from chamber 16 enters inlet 54 to act upon the smaller diameter piston 90. As the diameters of the piston 88 and 90 are different, the pressure in the primary chamber 144 of the control valve 18 will not only actuate piston 88 but because of the large effective area of the floating piston 92 withhold the actuation of piston 90 thereby eliminating the need of movement of the piston 90 during normal operation.

In any event as the pressure in primary chamber 144 acts upon the piston 88 it causes the valve plunger 104 to abut its valve seat 118 on the angular face of the rubber seat 136. This causes a tilting of the valve 132 to gradually introduce atmospheric pressure from the conduit 20 into the control chamber 114 and via the control discharge port 140 to the control chambers of the boost section of the housing 32 of the servomotor. As pressure is increased by the master cylinder 10, the valve plunger 104 will eventually cause the unseating of the rubber seat 128 from the seat 124 on the collar 120. At this point full atmospheric pressure is being fed to the control chamber of the booster section so that maximum pressure may be developed independently by the slave cylinders 40 and 42 for the wheel cylinders 48 and 50 of the separate braking systems of the vehicle.

In the event of a failure in the primary side of the master cylinder 10 causing a loss of pressure in the conduit 14, the secondary chamber of the master cylinder will via the conduit 16 introduce pressure to the secondary chamber 146 of the valve 18. As there will be no resisting pressure via the floating piston 92, piston 90 will actuate the valve in the manner aforementioned.

I claim:
1. A valve device for controlling the operation of servo devices of the differential air pressure or vacuum type, which valve device comprises:
 a housing;
 valve means at one end of said housing;
 piston means within a bore of said housing operatively connected to said valve means, said piston means including a first piston and a second piston of lesser effective area than said first piston; and
 a means between said first piston and said second piston in fluid commuication with said first piston and of an equal effective area as said first piston and operatively connected to said second piston to withhold the operation of said second piston so long as said first piston is controlling said valve means.

2. A valve device according to claim 1 wherein each valve means includes a pressure responsive reaction member adapted to transmit reaction forces to said piston means during the operation of said valve means.

3. A valve means operable by single and multiple input forces comprising:
 a housing including a valve chamber and a longitudinal bore;
 a first piston in said longitudinal bore having seal means effective to prevent communication of fluid pressure from one side of said first piston to the other side of said first piston and vice versa, said first piston being of a predetermined effective area;
 a second piston in said bore having seal means preventing fluid communication between one end of said second piston and the other end of said second piston and vice versa, said second piston having a lesser effective area in said bore than said first piston;
 a third piston between said first and second pistons in said bore, which third piston is subjected to fluid pressure controlling said first piston to be effective to withhold said second piston so long as fluid pressure is delivered to said first piston; and
 a valve in said housing operatively connected to said first piston for controlling communication of a reference fluid pressure and a control fluid pressure to a valve control port of said housing.

4. A valve means according to claim 3 wherein said valve is mounted in said housing by a diaphragm to provide reaction forces for said first or second pistons, as said valve is operated.

5. A valve according to claim 3 wherein said valve may be further characterized as including:
 a first valve seat formed on said housing;
 a plunger slidably guided by said housing and having a second valve seat on the forward end thereof which is arranged in said housing to the rear of said first valve seat so as to be movable toward said first valve seat, said plunger including a rearwardly projecting stem operatively connected to said first piston in said longitudinal bore, said plunger also having a longitudinal passageway therethrough;
 a poppet means comprising an annular surface for abutment with said first valve seat and a second surface operatively connected to said annular surface arranged to be abutted by said second valve seat as it moves in a direction of said first valve seat, said second surface being spring biased to the rear of the first surface and being operatively connected to a spool valve adapted to control an opening through the first annular surface, said second surface and said second valve seat being constructed so as to abut on an angle with respect to a plane passing through the abutment of said first annular surface on said first valve seat of said housing; and a means biasing said plunger so that said second valve seat is normally not in contact with said second surface so that reference pressure is communicated to said valve means via said passage through said plunger and said control pressure is prevented from communication to said valve control port by said valve mechanism.

6. A valve means according to claim 3 wherein said housing has an exterior vent leading into said bore to be between said third piston and said second piston to prevent fluid entrapment and blockage of the control of said second piston by said third piston.

7. A valve device for controlling the operation of servo devices of the differential pressure type comprising:
   a valve body with a bore therein having a first hydraulic inlet port and a second hydraulic inlet port as well as a control pressure inlet port, a reference pressure inlet port and a control pressure discharge port;
   a pair of valve actuating pistons disposed in said bore, one of which is of lesser effective area than the other, which pair of valve actuating pistons are interconnected by a floating piston having an effective area equal to that of the larger of the pair of valve actuating pistons, which pair of valve actuating pistons are independently connected to said first hydraulic inlet port and said second hydraulic inlet port; and
   valve means operatively connected to at least one of the pair of said valve actuating pistons and within said housing to be between said control pressure inlet port and said reference pressure inlet port and the control discharge port of the housing.

8. A valve device according to claim 7 wherein said bore in said housing containing said pair of valve actuating pistons is a stepped bore.

9. A valve device according to claim 8 wherein said valve means is further characterized as including a pressure responsive reaction member for providing reaction forces to said pair of valve actuating pistons during the actuation of said valve means after said control pressure inlet port has been communicated by said valve means to said control pressure discharge port of said housing.

References Cited

UNITED STATES PATENTS

| | | | |
|---|---|---|---|
| 3,268,270 | 8/1966 | Bailey | 303—13 |
| 3,362,756 | 1/1968 | Brandon | 303—13 |
| 2,299,211 | 10/1942 | Clench | 92—62 X |
| 2,577,462 | 12/1951 | Hackney | 92—61 X |

MILTON BUCHLER, Primary Examiner

JOHN J. McLAUGHLIN, Jr., Assistant Examiner

U.S. Cl. X.R.

60—54.5; 137—627.5; 303—6, 31, 40